US007941144B2

(12) United States Patent
Nylander et al.

(10) Patent No.: US 7,941,144 B2
(45) Date of Patent: May 10, 2011

(54) ACCESS CONTROL IN A MOBILE COMMUNICATION SYSTEM

(75) Inventors: Tomas Nylander, Värmdö (SE); Jari Tapio Vikberg, Järna (SE); Thomas Lars-Erik Lindqvist, Mölndal (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 267 days.

(21) Appl. No.: 11/565,827

(22) Filed: Dec. 1, 2006

(65) Prior Publication Data

US 2007/0270152 A1 Nov. 22, 2007

Related U.S. Application Data

(60) Provisional application No. 60/747,693, filed on May 19, 2006.

(51) Int. Cl.
*H04Q 7/20* (2006.01)
(52) U.S. Cl. .................................. 455/435.1; 455/444
(58) Field of Classification Search .................. 455/444, 455/435.1
See application file for complete search history.

(56) References Cited

U.S. PATENT DOCUMENTS

| | | | | |
|---|---|---|---|---|
| 5,937,353 A * | 8/1999 | Fapojuwo | ..................... | 455/444 |
| 6,014,563 A | 1/2000 | Szabo | | |
| 7,295,812 B2 * | 11/2007 | Haapoja et al. | ............... | 455/63.1 |
| 2003/0157927 A1 * | 8/2003 | Yi et al. | ......................... | 455/411 |
| 2005/0070283 A1 * | 3/2005 | Hashimoto et al. | ......... | 455/435.1 |
| 2005/0144647 A1 * | 6/2005 | Zussman et al. | ............... | 725/106 |
| 2006/0030333 A1 * | 2/2006 | Ward et al. | .................. | 455/456.1 |
| 2007/0054668 A1 * | 3/2007 | Scheinert et al. | ........... | 455/435.1 |

FOREIGN PATENT DOCUMENTS

| | | |
|---|---|---|
| EP | 1113641 A2 | 7/2001 |
| WO | WO 2005065214 A2 | 7/2005 |
| WO | WO 2007040449 A1 | 4/2007 |

* cited by examiner

*Primary Examiner* — Nghi H Ly
*Assistant Examiner* — Joseph Dean, Jr.

(57) ABSTRACT

A method and radio network controller (RNC) in a radio access network (RAN) for controlling access to a cellular telecommunication system. Upon receiving an access request from a given user equipment (UE) through a given radio base station (RBS), the RNC retrieves authorization information from an access control database within the RAN. The authorization information indicates whether the given UE is authorized to access the system through the given RBS. The RNC alternatively grants access or denies access to the UE based on the retrieved authorization information. The RBS is particularly useful for controlling access through small cells with limited capacity.

22 Claims, 3 Drawing Sheets

ACCESS CONTROL IN A MOBILE COMMUNICATION SYSTEM

CROSS-REFERENCE TO RELATED APPLICATIONS

This application claims benefit of U.S. Provisional Application No. 60/747,693 filed May 19, 2006, the disclosure of which is incorporated herein by reference.

STATEMENT REGARDING FEDERALLY SPONSORED RESEARCH OR DEVELOPMENT

NOT APPLICABLE

REFERENCE TO SEQUENCE LISTING, A TABLE, OR A COMPUTER PROGRAM LISTING COMPACT DISC APPENDIX

NOT APPLICABLE

BACKGROUND OF THE INVENTION

This invention relates to mobile communication systems. More particularly, and not by way of limitation, the invention is directed to an apparatus and method for fine-grained access control in a mobile communication network.

In cellular communication networks such as GSM, small cells known as picocells may serve small areas such as parts of a building, a street corner, or an airplane cabin. A picocell is generally smaller than a microcell, which in turn, is smaller than a macrocell. Picocells are usually used to extend coverage to indoor areas where outdoor signals do not reach well, or to add network capacity in areas with very dense phone usage, such as train stations. The picocells are traditionally provided as coverage or capacity extensions and do not include an access control mechanism. This means that all users allowed to access the macrocells of a public land mobile network (PLMN) will also be allowed to access the microcells and picocells of that same PLMN.

In addition, the term "femtocell" is being introduced (to indicate that the coverage area is relatively small and in some cases even smaller than the coverage of picocells). These femtocells are normally meant for a limited subset of the subscribers allowed access to the macrocells of a PLMN. For example, a femtocell may cover only the geographical area of a house and the allowed users may be the members of the family living in that house. So clearly a new access control mechanism is needed to control access to the femtocells. If the existing core network (CN)-level access control is used for the access control mechanism for the femtocells, it would add a significant signaling load to the core network because the core network would be involved in all access control procedures.

In Wideband Code Division Multiple Access (WCDMA) cellular networks, there is currently no equivalent to femtocells with access control support. Current access control procedures are not fine-grained enough to support a large number of very small cells.

It would be advantageous to have an access control apparatus and method, which reduces the signaling load on the core network while providing access control sufficiently fine-grained to support a large number of very small cells. The present invention provides such an apparatus and method.

BRIEF SUMMARY OF THE INVENTION

In one embodiment, the present invention provides access control in the RAN without interaction with the CN. Thus, the signaling load on the CN is reduced, and the risk of information getting out of synchronization is minimized (i.e., when the CN believes that a subscriber is registered on a particular area of the network, but this is not the case because the RAN has rejected access to that area of the network). The invention does not require functional changes in the UE or in the CN.

In one aspect, the present invention is directed to a method of controlling access in a cellular telecommunication system having a radio access network (RAN) in communication with a core network (CN). The method includes implementing access logic within the RAN for determining whether a given mobile user equipment (UE) is authorized to access the system through a given radio base station (RBS); and alternatively granting access or denying access to the UE based on a determination by the access logic in the RAN.

In another aspect, the present invention is directed to an apparatus for controlling access in a cellular telecommunication system having a RAN in communication with a CN. The apparatus includes means within the RAN for determining whether a given UE is authorized to access the system through a given RBS; and means within the RAN for alternatively granting access or denying access to the UE based on a determination by the access logic in the RAN.

In another aspect, the present invention is directed to a radio network controller (RNC) in a RAN in a cellular telecommunication system. The RNC controls access to a CN in communication with the RAN. The RNC includes first communication means for receiving an access request from a given UE through a given RBS; and means responsive to receiving the access request, for retrieving authorization information from an access control database within the RAN. The authorization information indicates whether the given UE is authorized to access the CN through the given RBS. The RNC also includes means for alternatively granting access or denying access to the UE based on the retrieved authorization information.

In another aspect, the present invention is directed to a radio network controller (RNC) in a RAN in a cellular telecommunication system. The RNC controls access to a CN in communication with the RAN. The cellular telecommunication system includes macrocells, microcells, picocells and smaller femtocells. The RNC includes means for controlling access through the macrocells, microcells and picocells, wherein access requests are forwarded to the CN for access decisions; and means for controlling access through the femtocells, wherein access decisions are made in the RNC and then also in the CN (i.e. both the RAN-level and the CN-level access control procedures are performed).

BRIEF DESCRIPTION OF THE SEVERAL VIEWS OF THE DRAWING

In the following, the essential features of the invention will be described in detail by showing preferred embodiments, with reference to the attached figures in which.

DETAILED DESCRIPTION OF THE INVENTION

Although described herein in terms of an embodiment in a WCDMA network, the invention may also be applied to other types of radio technologies such as GSM and Long Term Evolution (LTE) networks.

Figure 1:
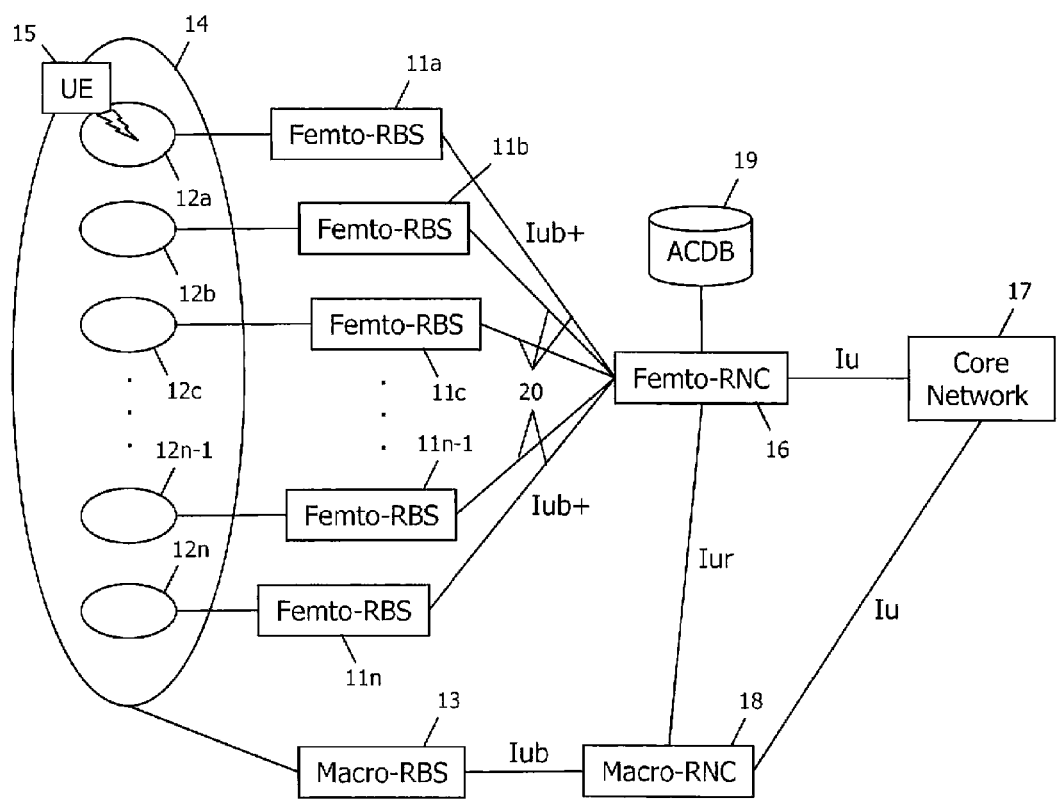
FIG. 1 is a simplified block diagram of a first exemplary embodiment of the system of the present invention.

FIG. 1 is a simplified block diagram of a first exemplary embodiment of the system of the present invention. In a radio access network (RAN) a number of small WCDMA Radio Base Stations (RBSs) referred to herein as Femto-RBSs 11a-11n serve small coverage areas referred to herein as femto-cells 12a-12n. The prefix "femto" is utilized to indicate that the coverage area is relatively small, while distinguishing the cells from microcells or picocells, which are generally associated with other types of cellular networks. A Macro-RBS 13 likewise serves a large macrocell area 14.

Each Femto-RBS provides WCDMA coverage for user equipments such as UE 15 and are connected to a Femto-RNC (Radio Network Controller) 16. The interface 20 between each Femto-RBS and the Femto-RNC is known as the "extended Iub" interface (the "Iub+" interface). The Iub+ interface is preferably formed by an internet protocol (IP) connection over an IP network. In some implementations, the Iub+ interface resembles the Iub interface, but is modified for conveying additional information. In the content of this description, the "+" indicates that the Femto-RBS signals the preconfigured Femto-RBS Identity (Femto-RBS-ID) to the Femto-RNC e.g. during the initial power-on procedure. In one embodiment, the IP-based transmission utilizes Fixed Broadband access (such as, for example, xDSL, Cable, and the like) to connect the Femto-RBSs to the Femto-RNC. In another embodiment, a variant of Wireless Broadband access (for example, WiMAX) may be utilized. The Femto-RNC may then connect to a core network (CN) 17 utilizing an Iu interface. The Macro-RBS 13 may connect to a Macro-RNC 18 utilizing an Iub interface, and the Macro-RNC connects to the CN utilizing an Iu interface.

An Access Control Database (ACDB) 19 is introduced in the RAN. The ACDB stores information regarding the Femto-RBSs 11a-11n and which UEs 15 are authorized to access each Femto-RBS. Each UE is identified by its International Mobile Subscriber Identity (IMSI) or by some other permanent mobile identity, and each Femto RBS is identified using, for example, a preconfigured Femto-RBS Identity (Femto-RBS-ID). The ACDB is shown in FIG. 1 as a standalone unit. However, it is a functional entity that alternatively may be incorporated in the Femto-RNC.

Access control is crucial to gain end-user acceptance for the Femto-RBS concept. When a Femto-RBS is used to enhance local coverage, for example in a home or Small Office or Home Office (SOHO) environment, only terminals belonging to the home or enterprise should be allowed to access the Femto-RBS. The end user or SOHO may have purchased the Femto-RBS, or may be paying for the transmission towards the Femto-RNC and CN. Femto-RBSs may serve only a limited number of end users, so it is important that authorized users do not experience bad quality or are denied access because unauthorized users have used the available bandwidth or exceeded the maximum number of allowed users.

The current Access Class concept in the RAN cannot be used for fine-grained Access Control required for Femto-RBSs. Only ten different Access Classes are available for normal end-users and this is not sufficient to build any logic for the use of Femto-RBSs. The same problem also applies to the mechanisms between the UE 15 and the CN 17. The CN can also reject a location updating request, but the CN is not aware of the current Femto-RBS being used for the location updating. In an alternative embodiment, this may be solved by defining a unique Service Area Identity (SAI) for each Femto-RBS. Although effective, this solution may not scale well, and it also creates additional load in the signaling towards the CN. It also creates dependency on needed CN functionality. Thus a femtocell network solution cannot be deployed without the CN functionality (i.e., it is preferred to deploy the femtocell network as consisting only of RAN-level components).

The present invention provides fine-grained RAN-based access control in a WCDMA-based system. During an access attempt, the Femto-RNC 16 queries the ACDB 19 for access identification information. Thus, the identification procedure, which is normally implemented in the CN 17, is implemented in the RAN/RNC. When a RRC connection is established between a UE and the Femto-RNC in order to perform a location updating procedure, the location updating request triggers the Femto-RNC to retrieve the IMSI from the UE. When the Femto-RNC receives the IMSI, the Femto-RNC queries the ACDB to determine whether the specific UE 15 is authorized to access this particular Femto-RBS. If so, access is granted, and the location updating request is forwarded to the CN. If the UE is not authorized to access this particular Femto-RBS, access is denied, and the Femto-RNC rejects the location updating request. This process is described in more detail in FIG. 3 below.

Figure 2:
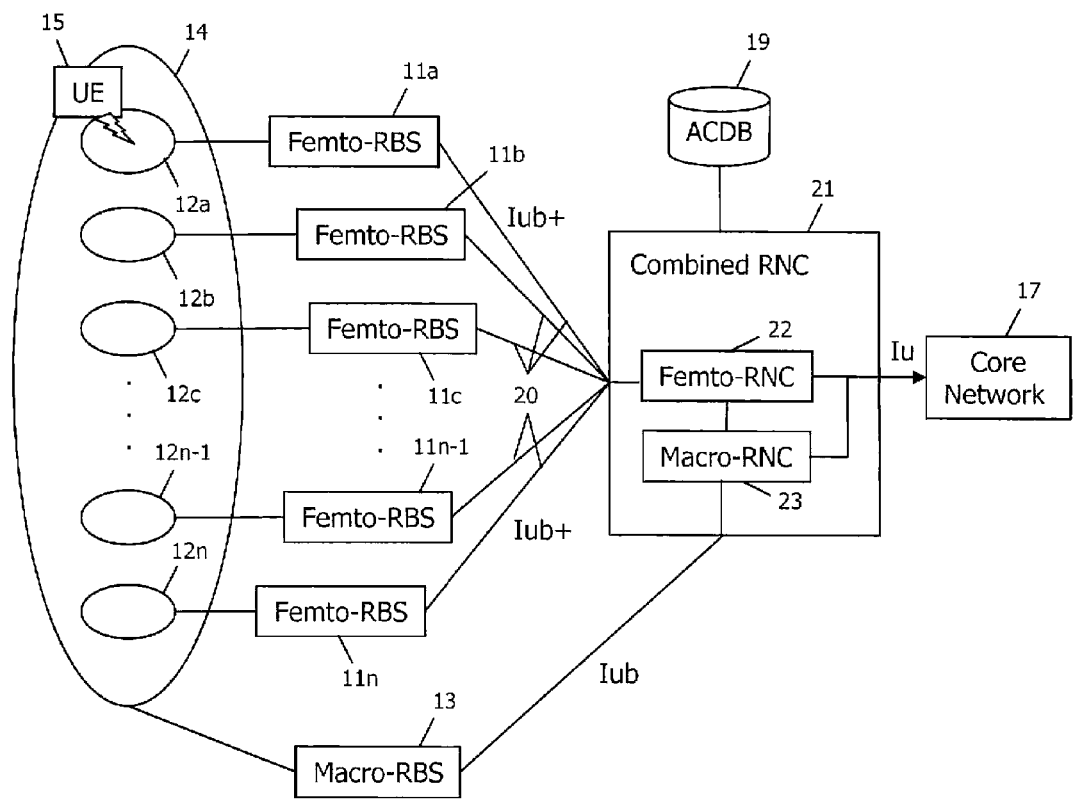
FIG. 2 is a simplified block diagram of a second exemplary embodiment of the system of the present invention.

FIG. 2 is a simplified block diagram of a second exemplary embodiment of the system of the present invention. This embodiment is similar to FIG. 1 except that the Femto-RNC 16 and Macro-RNC 18 are implemented as components of a combined RNC 21. The Femto-RBSs 11a-11n communicate with a Femto-RNC component 22 utilizing the Iub+ interface 20. As noted above, the Iub+ interface is preferably formed by an IP connection over an IP network. The Macro-RBS 13 communicates with a Macro-RNC component 23 utilizing an Iub interface. The combined RNC has Iur interfaces to other RNCs (Femto-RNCs, Macro-RNCs and combined RNCs) in the RAN. When a RRC connection is established between a UE and the Femto-RNC component in order to perform a location updating procedure, the location updating request triggers the Femto-RNC component to retrieve the IMSI from the UE. When the Femto-RNC component receives the UE's IMSI, the Femto-RNC component queries the ACDB 19 to determine whether the specific UE 15 is authorized to access this particular Femto-RBS. If so, access is granted, and the location updating request is forwarded to the CN 17. If the UE is not authorized to access this particular Femto-RBS, access is denied, and the Femto-RNC component rejects the location updating request.

A number of Location Area Identities (LAI) are reserved for the Femto-cell layer. These LAIs are defined in the CN 17 as normal. If the CN knows the LAI where a specific UE is located, and if the CN needs to page this UE, the CN knows which Femto-RNC(s) is/are controlling a specific Location Area and triggers the paging request towards the relevant Femto-RNC(s). When the Femto-RBS is powered on, it performs predefined activities and contacts a Femto-RNC for the initial and automatic configuration of the needed cell configuration and other information.

An LAI is also allocated for each femtocell during the automatic configuration procedure. If the number of femtocells is higher than the number of the reserved LAIs, the same LAI is shared by multiple femtocells. The LAI allocation mechanism may be a random allocation mechanism, round-robin algorithm, or other suitable allocation algorithm.

Figure 3:
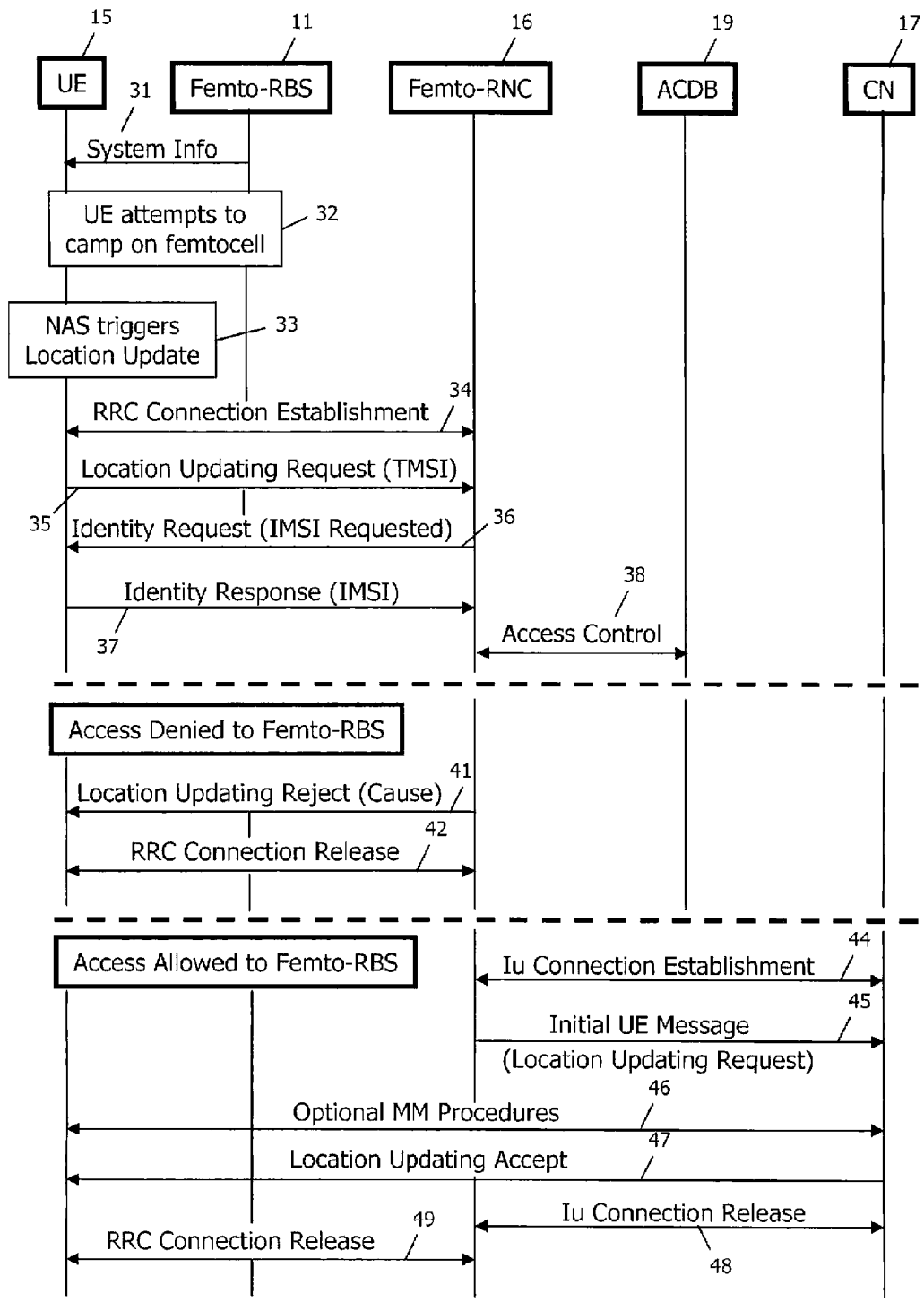
FIG. 3 is a signaling diagram illustrating the flow of messages in an exemplary embodiment of the method of the present invention.

FIG. 3 is a signaling diagram illustrating the flow of messages in an exemplary embodiment of the method of the present invention. The UE 15 is initially camped on a macrocell such as macrocell 14 when it detects a femtocell and reads relevant femtocell system information 31 from the Femto-RBS 11. At 32, the UE attempts to camp on the femtocell. At 33, the system information is passed to the Non-Access Stratum (NAS) layers (i.e., Mobility Management, MM) which detects that the Location Area Identity (LAI) of the femtocell is different than the previous LAI on which NAS registration was performed. Therefore, the NAS triggers a Location Updating procedure towards the network via lower layers, e.g., the Radio Resource Control (RRC) layer in the WCDMA RAN case.

The RRC layer in the UE triggers RRC connection establishment 34 by sending an RRC CONNECTION REQUEST message to the Femto-RNC 16 on the Random Access Channel (RACH). The RRC CONNECTION REQUEST message contains an Establishment Cause Information Element (IE) with e.g., the value "Registration" (indicating Location Updating procedure). The RRC connection may be established using existing principles as defined in 3GPP TS 25.331. Once the RRC connection is successfully established between the UE and the Femto-RNC, the UE sends a LOCATION UPDATING REQUEST message 35 to the Femto-RNC. This message contains mobile identity and other information (e.g., Location Updating type, Classmark, and so on).

Normally the Temporary Mobile Subscriber Identity (TMSI) is used as the mobile identity as shown in FIG. 3, but in some cases the IMSI (or some other permanent mobile identity) may be used as the mobile identity. The Location updating type indicates normally e.g., "Normal location updating" when the UE 15 moves between Location Areas. The Femto-RNC 16 knows also the Femto-RBS-ID used for the RRC connection establishment 34 and stores this information. The Femto-RBS-ID was provided to the Femto-RNC as part of the Iub+interface during the initial Femto-RBS startup procedure. The Femto-RNC also stores the received LOCATION UPDATING REQUEST message 35.

If the TMSI was used as the mobile identity in the LOCATION UPDATING REQUEST message 35, the Femto-RNC 16 triggers an Identification procedure towards the UE 15 by sending an IDENTITY REQUEST message 36 to the UE. The identity type requested may indicate "IMSI" or some other permanent mobile identity. The messages and information elements in the Identification procedure are as defined in 3GPP TS 24.008 with the main exception that the procedure is performed from the RAN (i.e., from the Femto-RNC) towards the UE rather than from the CN 17. The UE responds to the IDENTITY REQUEST message by sending an IDENTITY RESPONSE message 37 to the Femto-RNC. This message contains the IMSI of the UE. The Femto-RNC now holds both the IMSI of the UE 15 and the Femto-RBS-ID of the Femto-RBS 11. The Femto-RNC then performs an Access Control procedure 38. Note that if the IMSI was used as the mobile identity in the LOCATION UPDATING REQUEST message 35, the Femto-RNC skips the Identification procedure 36-37 and triggers the Access Control procedure 38 upon receiving the LOCATION UPDATING REQUEST message 35.

In the Access Control procedure, the Femto-RNC queries the ACDB 19 with the Femto-RBS-ID and the IMSI to determine whether this particular UE 15 is authorized to access this particular Femto-RBS 11. The ACDB uses the information configured in the database and returns an indication of whether access is to be denied or allowed.

If access to this particular Femto-RBS is denied, the Femto-RNC 16 rejects the Location updating procedure by sending a (MM) LOCATION UPDATING REJECT message 41 to the UE 15. The Femto-RNC also indicates a reject cause (for example, "Location Area not allowed" or "No Suitable Cells In Location Area" or other valid reject cause) so that the UE does not reattempt the Location updating procedure from this LA and femtocell. The UE may behave in one of several ways, depending on the type of reject cause received. For example, if the reject cause indicates "Location Area not allowed", the UE may store the LAI in the list of "forbidden location areas for regional provision of service" and perform a cell selection when back to the MM IDLE state. If the reject cause indicates "Roaming not allowed in this location area", the UE may store the LAI in the list of "forbidden location areas for roaming" and perform a PLMN selection instead of a cell selection when back to the MM IDLE state. If the reject cause indicates "No Suitable Cells In Location Area", the UE may store the LAI in the list of "forbidden location areas for roaming" and search for a suitable cell in another location area in the same PLMN.

The Femto-RNC 16 then initiates an RRC connection release procedure 42 by sending an RRC CONNECTION RELEASE message to the UE 15. The Femto-RNC may also include in the message, the Redirection Info IE, which is used to redirect the UE to another WCDMA macro layer frequency or to GSM.

If access to this particular Femto-RBS is allowed, the Femto-RNC 16 triggers the establishment of an Iu signaling connection 44. The Femto-RNC sends a message INITIAL UE MESSAGE 45 to the CN 17. This message contains the stored LOCATION UPDATING REQUEST message 35 and other information. The Iu signaling connection may be established using existing principles as defined in 3GPP TS 25.413 and in other relevant 3GPP specifications. In response, the CN may trigger optional MM procedures 46 such as Identification and/or Authentication towards the UE. If these procedures are successful, the CN accepts the Location Updating procedure and sends a LOCATION UPDATING ACCEPT message 47 to the UE. At 48, the CN releases the Iu signaling connection. The Femto-RNC releases the RRC connection by sending an RRC CONNECTION RELEASE message 49 without including the Redirection Info IE.

It should be noted that the message type octet of each NAS/L3 message contains a send sequence number, N(SD), field in bits 7 and 8 (see 3GPP TS 24.007). The main purpose of this field is to identify messages that have been duplicated (i.e., messages that the UE needs to resend in some scenarios). If the CN 17 is indicated in the system information as being a version earlier than Rel-99, then bit 8 shall be set to 0 and bit 7 is reserved for the N(SD) in messages sent from the UE 15. In messages sent from the CN, bits 7 and 8 are coded with a "0". If the CN 17 is indicated in the system information as being Rel-99 or later, bits 7 and 8 are reserved for the N(SD) in messages sent from the UE. In messages sent from the CN, bits 7 and 8 are coded with a "0". The two-bit N(SD) is always used in UMTS/WCDMA networks. In other words, core networks supporting UTRAN/3G access are always Rel-99 or later. Both variants are possible in GSM networks when GERAN/2G access is used.

Since the RAN in the present invention is injecting NAS messages in the communication between the UE 15 and the CN 17, there is the possibility that the send sequence number, N(SD), may get out of synchronization between the UE 15 and the CN 17. This may be a problem if the CN is performing any checks on the received N(SD).

Consider the following example:
a) The UE 15 sends the LOCATION UPDATING REQUEST message 35 with N(SD)=0.
b) The Femto-RNC 16 sends the IDENTITY REQUEST message 36 to the UE, and the UE responds with the IDENTITY RESPONSE message 37 and N(SD)=1.
c) If access is allowed, the Femto-RNC forwards the LOCATION UPDATING REQUEST message with N(SD)=0 to the CN 17.

Therefore, the next NAS procedure triggered by the CN may create the problem because the next expected N(SD) in the CN is 1, but the UE will use N(SD)=2 or N(SD)=0 depending on the indicated core network release.

In an embodiment of the present invention, a procedure is performed to synchronize the N(SD). If the CN 17 is performing checks on the N(SD), the Femto-RNC 16 can be configured to perform N(SD)-mapping during the Location updating procedure when the Identification procedure was triggered from the Femto-RNC. The N(SD)-mapping procedure may include the steps:

a) The initial LOCATION UPDATING REQUEST message 35 from the UE with N(SD)=0 is forwarded to the CN.
b) The N(SD) for all uplink NAS-messages is decreased by one, also taking into account the maximum value of N(SD) depending on the indicated core network release.

As described above, the present invention implements access control in the RAN without interaction with the CN. Thus, the signaling load on the CN is reduced, and the risk of information getting out of synchronization is minimized. It should further be noted that no functional changes are needed in the UE or in the CN. Although described in terms of an embodiment in a WCDMA network, the invention may also be applied to other types of radio technologies such as GSM and Long Term Evolution (LTE) networks.

Although preferred embodiments of the present invention have been illustrated in the accompanying drawings and described in the foregoing Detailed Description, it is understood that the invention is not limited to the embodiments disclosed, but is capable of numerous rearrangements, modifications, and substitutions without departing from the scope of the invention. The specification contemplates all modifications that fall within the scope of the invention defined by the following claims.

What is claimed is:

1. A method of controlling access in a cellular telecommunication system having a radio access network (RAN) in communication with a core network (CN), said method comprising:
   implementing access logic within the RAN for determining whether a given mobile user equipment (UE) is authorized to access the CN through a given radio base station (RBS);
   implementing an access control database within the RAN, said database associating RBS identifiers with International Mobile Subscriber Identities (IMSIs) of UEs authorized to access the CN through associated RBSs;
   receiving by the RAN, a Location Update Request message from the given UE, said Location Update Request message including a Temporary Mobile Subscriber Identity (TMSI) assigned to the UE;
   in response to receiving the Location Update Request message, triggering an Identification procedure in which the RAN requests the given UE to send the given UE's International Mobile Subscriber Identity (IMSI);
   receiving by the RAN, the given UE's IMSI, wherein the given UE sends the IMSI to the RAN without the knowledge of the CN, thus causing the given UE to advance its uplink sequence number while the CN is expecting an uplink sequence number that has not been advanced;
   determining by the access logic in the RAN, whether the given UE is associated with the given RBS in the access control database;
   alternatively granting or denying the given UE access to the CN based on a determination by the access logic in the RAN; and
   when the UE is granted access to the CN, correcting by the RAN, uplink message sequence numbers between the given UE and the CN to provide uplink sequence numbers expected by the CN.

2. The method according to claim 1, wherein the step of implementing access logic within the RAN includes implementing access logic in a radio network controller (RNC).

3. The method according to claim 1, wherein the step of correcting uplink message sequence numbers between the UE and the CN includes the steps of:
   forwarding the Location Update Request message to the CN with an original message sequence number; and
   altering the sequence numbers of subsequent uplink messages to account for the number of messages that were sent from the given UE to the RAN and that were not forwarded to the CN.

4. The method according to claim 1, wherein the step of alternatively granting or denying the given UE access to the CN includes:
   rejecting the access request by the access control logic without signaling to the CN when the given UE is not associated with the given RBS in the access control database; and
   forwarding the access request by the access control logic to the CN when the given UE is associated with the given RBS in the access control database.

5. The method according to claim 4, wherein the given RBS is a Femto-RBS serving a femtocell smaller than a macrocell, said Femto-RBS having capacity to serve only a small predefined number of UEs identified in the access control database.

6. The method according to claim 5, further comprising controlling access through the macrocell within the CN.

7. The method according to claim 5, further comprising controlling access through the macrocell within a RAN-based access control node adapted to control access through the femtocell and to separately control access through the macrocell.

8. An apparatus for controlling access in a cellular telecommunication system having a radio access network (RAN) in communication with a core network (CN), said apparatus comprising:
   access logic within the RAN for determining whether a given mobile user equipment (UE) is authorized to access the CN through a given radio base station (RBS);
   an access control database within the RAN for associating RBS identifiers with International Mobile Subscriber Identities (IMSIs) of UEs authorized to access the CN through associated RBSs;
   communication means within the RAN for receiving a Location Update Request message from the given UE, said Location Update Request message including a Temporary Mobile Subscriber Identity (TMSI) assigned to the UE;
   means responsive to receiving the Location Update Request message for triggering an Identification procedure in which the RAN requests the given UE to send the given UE's International Mobile Subscriber Identity (IMSI), and for receiving the given UE's IMSI, wherein the given UE sends the IMSI to the RAN without the knowledge of the CN, thus causing the given UE to advance its uplink sequence number while the CN is expecting an uplink sequence number that has not been advanced;
   wherein the access logic in the RAN determines whether the given UE is associated with the given RBS in the access control database, and alternatively grants or denies the given UE access to the CN based on a determination by the access logic in the RAN; and wherein when the access logic grants the given UE access to the CN, the communication means is adapted to correct uplink message sequence numbers between the given UE and the CN to provide uplink sequence numbers expected by the CN.

9. The apparatus according to claim 8, wherein the communication means includes means, responsive to the access logic granting the given UE access to the CN, for forwarding the Location Update Request message to the CN with an original message sequence number, and for altering the sequence numbers of subsequent uplink messages to account for the number of messages that were sent from the given UE to the RAN and that were not forwarded to the CN.

10. The apparatus according to claim 8, wherein the access logic includes:
means for rejecting the access request without signaling to the CN, responsive to a determination that the given UE is not associated with the given RBS in the access control database; and
means for forwarding the access request to the CN, responsive to a determination that the given UE is associated with the given RBS in the access control database.

11. The apparatus according to claim 10, wherein the given RBS is a Femto-RBS serving a femtocell smaller than a macrocell, said Femto-RBS having capacity to serve only a small predefined number of UEs identified in the access control database.

12. The apparatus according to claim 11, further comprising means within the CN for controlling access through the macrocell.

13. The apparatus according to claim 11, further comprising a RAN-based access control node for controlling access to the CN through the macrocell.

14. The apparatus according to claim 11, further comprising a RAN-based access control node for controlling access to the CN through the macrocell, wherein the RAN-based access control node is adapted to control access to the CN through the femtocell and to separately control access to the CN through the macrocell.

15. The apparatus according to claim 14, wherein the RAN-based access control node is a radio network controller (RNC).

16. In a radio access network (RAN), a RAN-based access control node for controlling access to a core network (CN) in communication with the RAN, said RAN-based access control node comprising:
first communication means for receiving an access request to access the CN from a given mobile user equipment (UE) through a given radio base station (RBS), said access request including a Temporary Mobile Subscriber Identity (TMSI) assigned to the UE;
means responsive to receiving the access request for triggering an Identification procedure in which the RAN requests the given UE to send the given UE's International Mobile Subscriber Identity (IMSI), and for receiving the given UE's IMSI, wherein the given UE sends the IMSI to the RAN-based access control node without the knowledge of the CN, thus causing the given UE to advance its uplink sequence number while the CN is expecting an uplink sequence number that has not been advanced;
means responsive to receiving the given UE's IMSI, for retrieving authorization information from an access control database within the RAN, said database associating RBS identifiers with IMSIs of UEs authorized to access the CN through associated RBSs;
means for alternatively granting or denying the given UE access to the CN based on the retrieved authorization information; and
second communication means for forwarding the access request to the CN, responsive to authorization information that indicates the given UE is authorized to access the system through the given RBS, wherein the second communication means decreases the sequence numbers of subsequent uplink messages from the given UE to the CN in order to synchronize the sequence numbers with sequence numbers expected by the CN.

17. The RAN-based access control node according to claim 16, wherein the means for alternatively granting or denying the given UE access to the CN includes means for rejecting the access request without signaling to the CN, responsive to authorization information that indicates the given UE is not authorized to access the system through the given RBS.

18. The RAN-based access control node according to claim 16, wherein the RAN-based access control node is a radio network controller (RNC).

19. In a radio access network (RAN) in a cellular telecommunication system, a RAN-based access control node for controlling access to a core network (CN) in communication with the RAN, wherein the cellular telecommunication system includes macrocells and smaller femtocells, said RAN-based access control node comprising:
means for controlling access to the CN through the macrocells, wherein access requests are forwarded to the CN for access decisions; and
means for controlling access to the CN through the femtocells, wherein access decisions are made in the RAN-based access control node, said means for controlling access to the CN through the femtocells comprising:
first communication means for receiving an access request to access the CN from a given mobile user equipment (UE) through a given radio base station (RBS), said access request including a Temporary Mobile Subscriber Identity (TMSI) assigned to the given UE;
means responsive to receiving the access request for triggering an Identification procedure in which the RAN requests the given UE to send the given UE's International Mobile Subscriber Identity (IMSI), and for receiving the given UE's IMSI, wherein the given UE sends the IMSI to the RAN-based control node without the knowledge of the CN, thus causing the given UE to advance its uplink sequence number while the CN is expecting an uplink sequence number that has not been advanced;
means responsive to receiving the given UE's IMSI, for retrieving authorization information from an access control database within the RAN, said database associating RBS identifiers with International Mobile Subscriber Identities (IMSIs) of UEs authorized to access the CN through associated RBSs;
means for alternatively granting or denying the given UE access to the CN based on the retrieved authorization information; and
second communication means for forwarding the access request to the CN, responsive to authorization information that indicates the given UE is authorized to access the system through the given RBS, wherein the second communication means decreases the sequence numbers of subsequent uplink messages from the given UE to the CN in order to synchronize the sequence numbers with sequence numbers expected by the CN.

20. The RAN-based access control node according to claim 19, wherein the means for alternatively granting or denying the given UE access to the CN includes means for rejecting the access request without signaling to the CN, responsive to authorization information that indicates the given UE is not authorized to access the system through the given RBS.

21. The RAN-based access control node according to claim 19, wherein the cellular telecommunication system also includes microcells and picocells larger than the femtocells, and the means for controlling access to the CN through the macrocells also controls access to the CN through the mircocells and picocells, wherein access requests are forwarded to the CN for access decisions.

22. The RAN-based access control node according to claim 19, wherein the RAN-based access control node is a radio network controller (RNC).

* * * * *

UNITED STATES PATENT AND TRADEMARK OFFICE
CERTIFICATE OF CORRECTION

| | | |
|---|---|---|
| PATENT NO. | : 7,941,144 B2 | Page 1 of 1 |
| APPLICATION NO. | : 11/565827 | |
| DATED | : May 10, 2011 | |
| INVENTOR(S) | : Nylander et al. | |

It is certified that error appears in the above-identified patent and that said Letters Patent is hereby corrected as shown below:

In Column 2, Line 49, delete "DRAWING" and insert -- DRAWINGS --, therefor.

In Column 3, Line 3, delete "(RAN)" and insert -- (RAN), --, therefor.

Signed and Sealed this
Eighth Day of November, 2011

David J. Kappos
*Director of the United States Patent and Trademark Office*